US008804209B2

(12) United States Patent
Iwayama et al.

(10) Patent No.: US 8,804,209 B2
(45) Date of Patent: Aug. 12, 2014

(54) IMAGE PROCESSING APPARATUS, IMAGE PROCESSING SYSTEM, IMAGE PROCESSING METHOD AND COMPUTER READABLE MEDIUM

(71) Applicant: PFU Limited, Kahoku (JP)

(72) Inventors: Akira Iwayama, Kahoku (JP); Masayoshi Hayashi, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 13/714,304

(22) Filed: Dec. 13, 2012

(65) Prior Publication Data

US 2013/0215480 A1 Aug. 22, 2013

(30) Foreign Application Priority Data

Feb. 20, 2012 (JP) ................................ 2012-033923

(51) Int. Cl.
| H04N 1/04 | (2006.01) |
| G06F 3/12 | (2006.01) |
| H04N 1/38 | (2006.01) |
| H04N 1/46 | (2006.01) |
| H04N 1/60 | (2006.01) |
| G03F 3/08 | (2006.01) |
| G06K 9/00 | (2006.01) |
| G06K 9/40 | (2006.01) |
| G06K 9/32 | (2006.01) |
| G06K 9/34 | (2006.01) |
| G06T 5/00 | (2006.01) |
| H04N 1/409 | (2006.01) |
| G06T 7/00 | (2006.01) |
| H04N 1/407 | (2006.01) |

(52) U.S. Cl.
CPC ....... *H04N 1/04* (2013.01); *G06T 5/008* (2013.01); *H04N 1/407* (2013.01); *H04N 1/4092* (2013.01); *G06T 7/0083* (2013.01)
USPC .......... 358/475; 358/1.15; 358/513; 358/463; 358/1.9; 358/519; 382/167; 382/266; 382/293; 382/296; 382/176

(58) Field of Classification Search
USPC ................. 358/475, 1.15, 513, 463, 1.9, 519; 382/167, 266, 296, 293, 176
See application file for complete search history.

(56) References Cited

U.S. PATENT DOCUMENTS 5,696,842 A * 12/1997 Shirasawa et al. ............ 382/176
5,907,414 A * 5/1999 Hiratsuka ..................... 358/513

(Continued)

FOREIGN PATENT DOCUMENTS

| JP | 6-189131 | 7/1994 |
| JP | 2007-19853 | 1/2007 |
| JP | 2009-260893 | 11/2009 |

*Primary Examiner* — Charlotte M Baker
*Assistant Examiner* — Rury Grisham
(74) *Attorney, Agent, or Firm* — Christie, Parker & Hale, LLP

(57) ABSTRACT

An image processing apparatus including, an input unit for inputting image data including a document region, a storage for storing the brightness of each pixel on a first main scan line outside the document region, a corrector for correcting the brightness of each pixel on the first main scan line in accordance with the brightness of pixels in a first part and the brightness of pixels in a second part on a second main scan line following the first main scan line, and an edge point detector for detecting an edge point of the document region situated on the second main scan line in accordance with the difference between the brightness of each pixel on the first main scan line corrected and the brightness of each pixel on the second main scan line respectively corresponding to each pixel on the first main scan line.

8 Claims, 13 Drawing Sheets

(56) References Cited

U.S. PATENT DOCUMENTS

| | | |
|---|---|---|
| 5,940,544 A * | 8/1999 | Nako ............................ 382/293 |
| 6,373,992 B1 * | 4/2002 | Nagao ........................... 382/266 |
| 6,667,815 B1 * | 12/2003 | Nagao ............................ 358/1.9 |
| 7,102,786 B2 * | 9/2006 | Takahashi et al. ............. 358/1.9 |
| 7,327,879 B2 * | 2/2008 | Nako et al. .................... 382/167 |
| 7,376,269 B2 * | 5/2008 | Klassen et al. ................ 382/167 |
| 8,593,689 B2 * | 11/2013 | Chatow et al. ................. 358/2.1 |
| 2002/0041406 A1 * | 4/2002 | Takahashi et al. ............ 358/519 |
| 2003/0095722 A1 * | 5/2003 | Regimbal ...................... 382/296 |
| 2009/0244608 A1 * | 10/2009 | Tsuji ............................ 358/1.15 |
| 2011/0043874 A1 * | 2/2011 | Saika ........................... 358/475 |
| 2011/0075168 A1 * | 3/2011 | Ikari .............................. 358/1.9 |
| 2013/0271796 A1 * | 10/2013 | Landa ........................... 358/463 |

\* cited by examiner

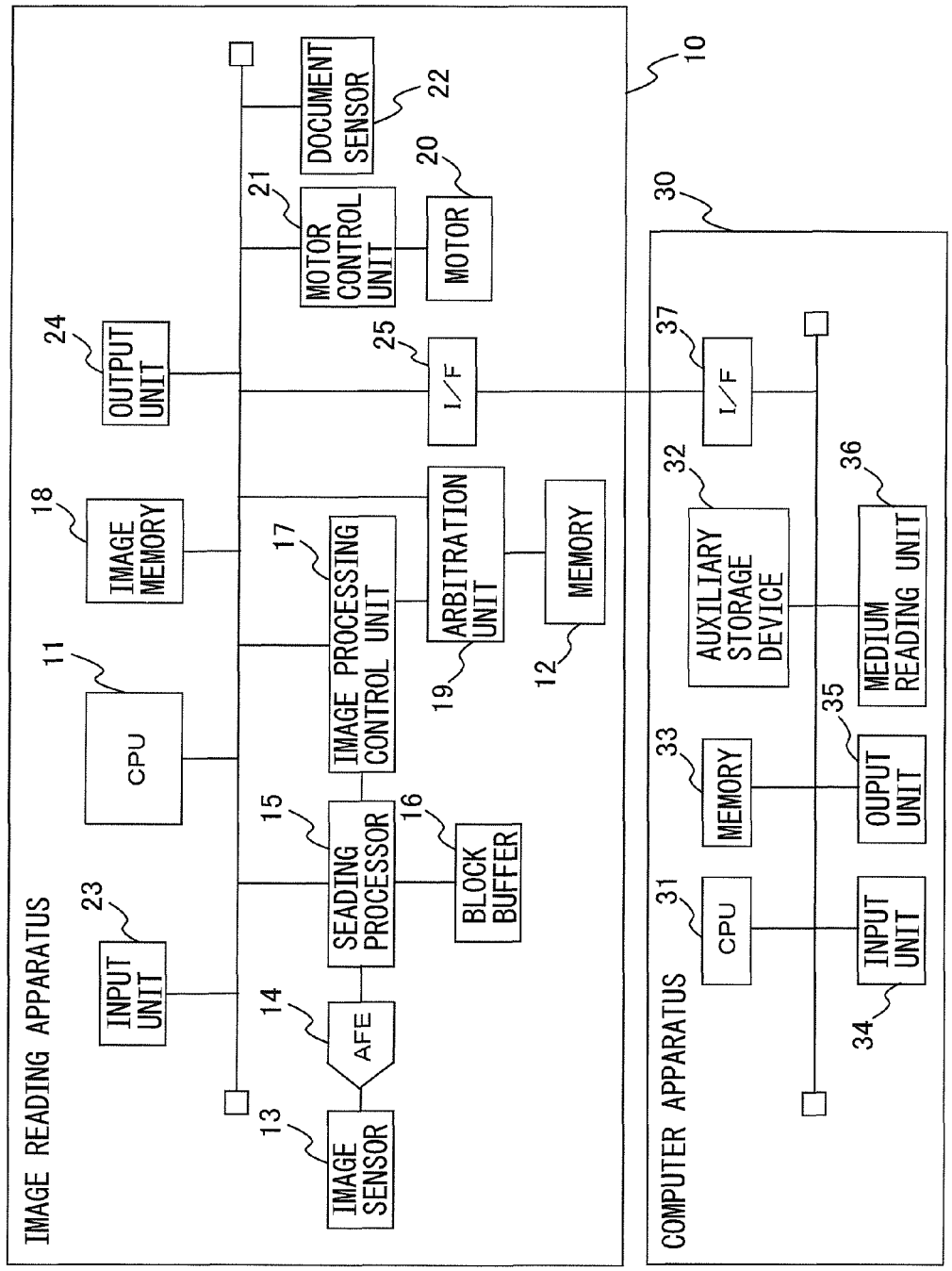

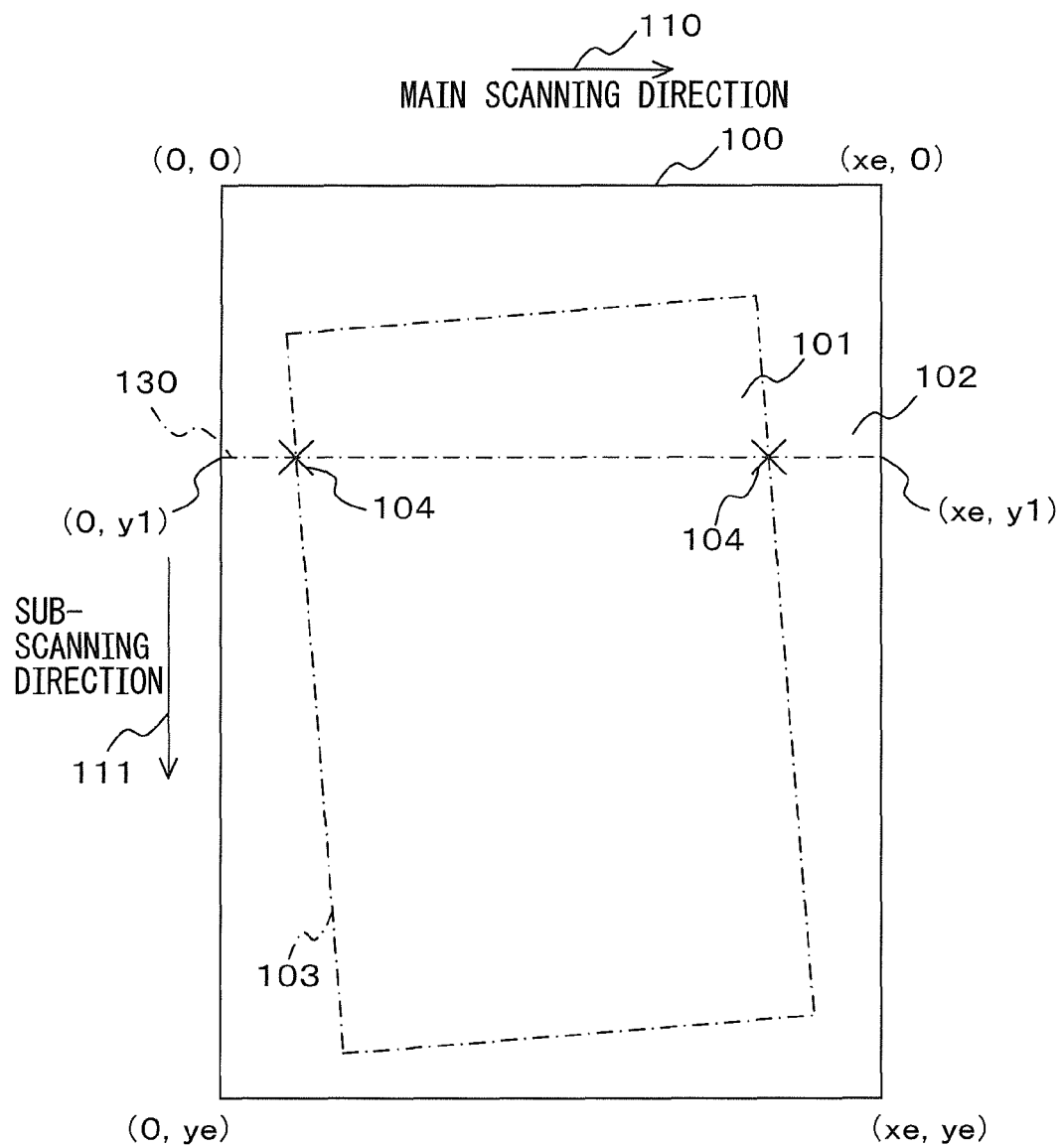

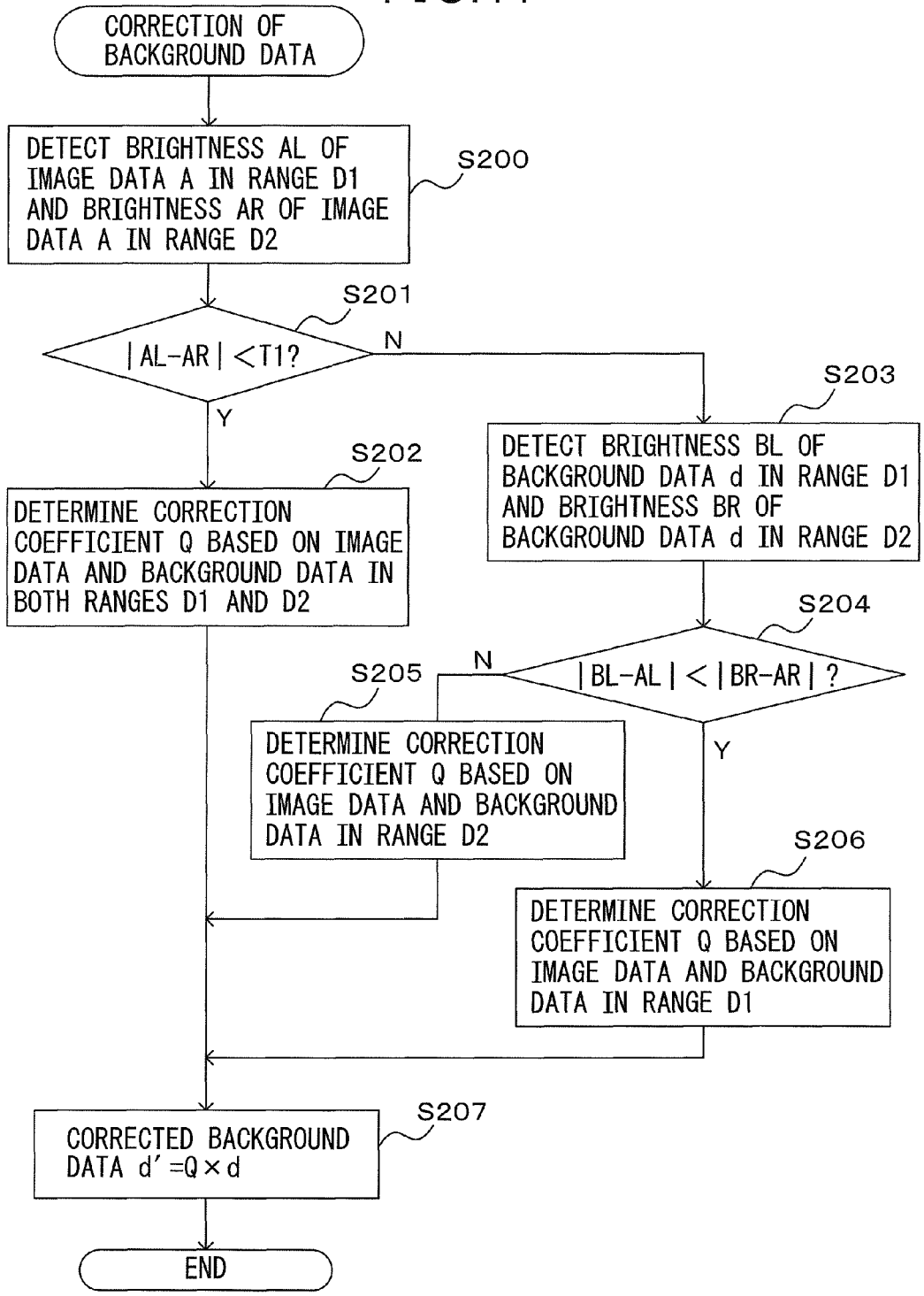

IMAGE PROCESSING APPARATUS, IMAGE PROCESSING SYSTEM, IMAGE PROCESSING METHOD AND COMPUTER READABLE MEDIUM

CROSS-REFERENCE TO RELATED APPLICATIONS

This application is based upon and claims the benefit of priority of prior Japanese Patent Application No. 2012-33923, filed on Feb. 20, 2012, the entire contents of which are incorporated herein by reference.

TECHNICAL FIELD

Embodiments described herein relate to an image processing apparatus, an image processing system, an image processing method and an image processing program.

BACKGROUND

An image processing apparatus which clips an image of a document region from image data obtained by reading a document has been known. FIG. 1 is a schematic view showing image data obtained by reading a document. The image data 100 include a document region 101 formed from a set of pixels obtained by reading an image of a document with an imaging device, and a background region 102 formed from a set of pixels obtained by detecting the light outside the document with the imaging device. In order to clip an image of the document region, edge points 104 on the boundary line 103 between the document region 101 and the background region 102 are detected. In FIG. 1, each "X" mark denotes different edge point 104 on the boundary line 103.

As a technology for detecting a terminal portion of a document, an image reading apparatus has been known which cancels noise in the terminal portion of the document by determining a specific region as the terminal portion of the document based on shading data, and replacing the value in the specific region of image data with a prescribed value. A mask correction circuit of the image reading apparatus determines a specific region as a terminal portion of the document on image data inputted from a gamma correction circuit based on the shading data to be utilized for performing shading correction. The value of the image data determined as the specific region is converted with a prescribed value and is outputted to each circuit in later stage.

An image reading apparatus which suppresses density difference among respective elements of a line sensor. This image reading apparatus includes a line sensor having photo detectors arrayed along a prescribed direction, and a white reference plate provided in a second read-out area, among read-out areas of the line sensor, i.e., is other than a first read-out area for reading-out an image recorded at least on a recording medium. The image reading apparatus also includes correction means for correcting the pixel value in the first read-out area read by a first photo detector corresponding to the first read-out area, based on the pixel value of the second read-out area read by a second photo detector corresponding to the second read-out area.

Related art is disclosed in Japanese Laid-open Patent Publications No. 2009-260893 and 2007-19853.

SUMMARY

In the area 102 of FIG. 1, uneven brightness, i.e., variation of brightness may sometimes occur. One of the causes of the variation of brightness in the background region may be inclination or flexure of a background unit of the image reading apparatus, applied to the reverse side of the document (hereinafter simply referred to as "background unit"). When there is inclination or flexure of the background unit, difference is produced in the separation of the background unit and the photo-detector so that the variation of brightness occurs in the background region 102 formed by pixels reading the light reflected from the background unit. Inclination or flexure of the background unit may be produced not only due to failure of the supporting member of the background unit, but also when a document that is thick, for example, is read.

When brightness of the background region 102 near the boundary with the document region 101 fluctuates due to variation of brightness of the background region 102, it may cause false detection of the position of an edge point 104. It is an object of the apparatus, system, method and computer readable medium disclosed herein to improve the detection accuracy of detecting an edge point of the document region when there is fluctuation of brightness in the background region of image data including the document region.

In accordance with an aspect of the embodiment, there is provided an image processing apparatus including an input unit for inputting image data including a document region, a storage for storing the brightness of each pixel on a first main scan line that is a main scan line outside the document region, a corrector for correcting the brightness of each pixel on the first main scan line stored in the storage in accordance with the brightness of pixels in a first part and the brightness of pixels in a second part on a second main scan line following the first main scan line, and an edge point detector for detecting an edge point of the document region situated on the second main scan line in accordance with the difference between the brightness of each pixel on the first main scan line corrected by the corrector and the brightness of each pixel on the second main scan line respectively corresponding to each pixel on the first main scan line.

In accordance with another aspect of the embodiment, there is provided an image processing system having an image reading apparatus and a computer apparatus that receives via communication with the image reading apparatus an image read by the image reading apparatus. The image processing system includes a storage for storing, from the image data including a document region read by the image reading apparatus, the brightness of each pixel on a first main scan line that is a main scan line outside the document region, a corrector for correcting the brightness of each pixel on the first main scan line stored in the storage in accordance with the brightness of pixels in a first part and the brightness of pixels in a second part on a second main scan line following the first main scan line, and an edge point detector for detecting an edge point of the document region situated on the second main scan line in accordance with the difference between the brightness of each pixel on the first main scan line corrected by the corrector and the brightness of each pixel on the second main scan line respectively corresponding to each pixel on the first main scan line.

In accordance with an aspect of the embodiment, an image processing method is provided. The image processing method includes acquiring image data including a document region, storing in a storage the brightness of each pixel on a first main scan line that is a main scan line outside the document region, correcting the brightness of each pixel on the first main scan line stored in the storage in accordance with the brightness of pixels in a first part and the brightness of pixels in a second part on a second main scan line following the first main scan line, and detecting an edge point of the document region situated on the second main scan line in accordance with the difference between the corrected brightness of each pixel on the first main scan line and the brightness of each pixel on the second main scan line respectively corresponding to each pixel on the first main scan line.

In accordance with an aspect of the computer program, a computer-readable, non-transitory medium storing a computer program for image processing is provided. The computer program causes a processor to execute a process, the process including, acquiring image data including a document region, storing in a storage the brightness of each pixel on a first main scan line that is a main scan line outside the document region, correcting the brightness of each pixel on the first main scan line stored in the storage in accordance with the brightness of pixels in a first part and the brightness of pixels in a second part on a second main scan line following the first main scan line, and detecting an edge point of the document region situated on the second main scan line in accordance with the difference between the corrected brightness of each pixel on the first main scan line and the brightness of each pixel on the second main scan line respectively corresponding to each pixel on the first main scan line.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 6 is a view for illustrating a target line on which an edge point is detected.

FIG. 11 is a view for illustrating the correction processing of background data.

DESCRIPTION OF EMBODIMENTS

1. Hardware Construction

Figure 2:
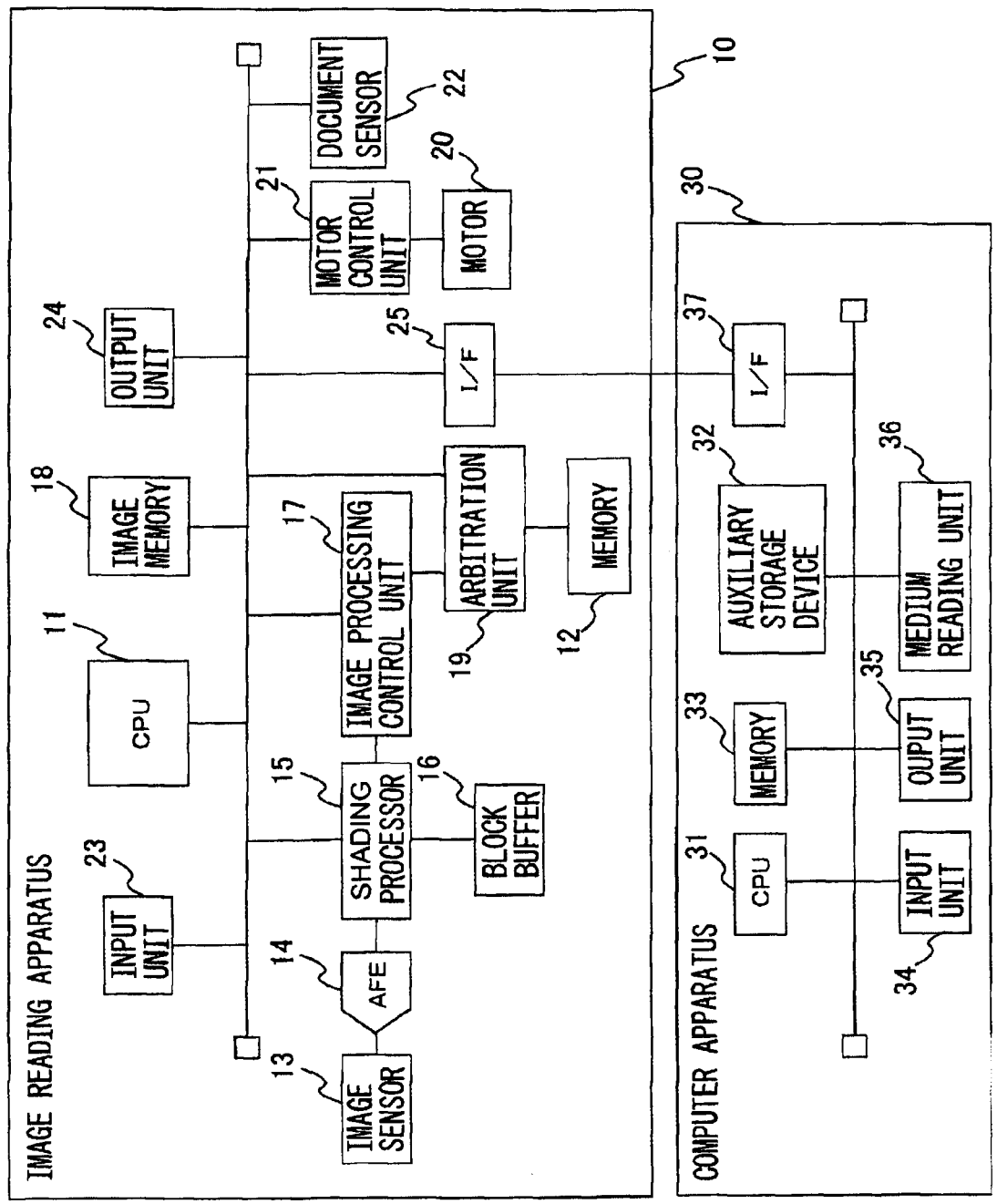
FIG. 2 is a view depicting the hardware construction of an image processing system.

Preferred exemplary embodiments will be described below with reference to appended drawings. FIG. 2 is a view depicting the hardware construction of an image processing system. The image processing system 1 includes an image reading apparatus 10 and a computer apparatus 30. The image reading apparatus 10 reads-out a two-dimensional document and generates an image signal corresponding to the document. The image reading apparatus 10 may be, for example, an image reading apparatus that reads by scanning a two-dimensional document exposed to light from plural light sources. Examples of such image reading apparatus include, for example, various scanning apparatuses such as a feeder scanner, a flatbed scanner, a handy scanner, etc. An exemplary embodiment will be described below with a feeder scanner as an example.

The computer apparatus 30 is capable of communicating with the image reading apparatus 10 via a wired or wireless communication line, and receives an image signal of the document read-out by the image reading apparatus 10 from the image reading apparatus 10 via this communication line.

The image reading apparatus 10 includes a CPU (Central Processing Unit) 11, a memory 12, an image sensor 13, an AFE (Analog Front-End Processor) 14, a shading processor 15, and a block buffer 16. The image reading apparatus 10 also includes an image processing control unit 17, an image memory 18, an arbitration unit 19, a motor 20, a motor control unit 21, a document sensor 22, an input unit 23, an output unit 24, and an interface (I/F).

CPU 11 controls the operation of the image reading apparatus 10 in accordance with the computer program stored in the memory 12. In an exemplary embodiment, CPU 11 may process a document image read by the image reading apparatus 10. The memory 12 may store computer programs for such image processing. The memory 12 may store computer programs executed by CPU 11 and data used in the execution of the computer program. The memory 12 may include a non-volatile storage device for storing the program or a volatile memory for temporarily storing data.

The image sensor 13 takes an image of a 2-dimensional document and outputs the image signal corresponding to the document. The image sensor 13 includes an imaging device such as one-dimensional or tow-dimensional array of a CCD (Charge Coupled Device) sensor or a CMOS (Complementary Metal Oxide Semiconductor) sensor and an optical system forming an image of the document on the imaging device. AFE 14 performs amplification or other signal processing on the image signal outputted from the image sensor 13, and outputs the processed image signal to the shading processor 15.

The shading processor 15 contains the image signal received from AFE 14 in the block buffer 16 as image data, and after performing shading correction on the image data, outputs the data to the image processing control unit 17. The image processing control unit 17 performs prescribed image processing on the image data after being subjected to shading processing, and stores the image data in the image memory 18. In other exemplary embodiment, the shading processor 15 may store the image data after shading processing in the image memory 18, and the image processing control unit 17 may input the image data from the image memory 18. The arbitration unit 19 arbitrates access to the memory 12 by the image processing control unit 17 for image processing and access to the memory 12 by CPU 11 so as not to compete with each other.

The motor 20 imparts rotational drive to the roller that conveys a document from a document tray of the document reader apparatus 10 to a position for the document to be read by the image sensor 13. The motor control unit 21 controls the operation of the motor 20 for conveying the document at the time of reading the document. The document sensor 22 detects whether or not the document is situated at the specified position on the conveyance path for conveying the document to the document reading position.

In an exemplary embodiment, the shading processor 15, the image processing unit 17, the arbitration unit 19 and the motor control unit 21 may be implemented as a logic circuit mounted in the image reading apparatus 10. The logic circuit may be, for example, a LSI (large scale integration), AISC (Application Specific Integrated Circuit), FPGA (Field-Programming Gate Array), etc. In another exemplary embodiment, the shading processor 15, the image processing unit 17, the arbitration unit 19 and the motor control unit 21 may be implemented as an electronic circuit mounted in the image reading apparatus 10, including a processor such as CPU or DSP (digital signal processor) and a memory storing programs.

The input unit 23 is an input device that receives input operation by a user. The input unit 23 may be, for example, a button, a scroll wheel, a key pad, a keyboard, a pointing device, or a touch panel, etc. The output unit 24 is an output device that presents information from the image reading apparatus 10 to a user. For example, the output unit 24 may be a display device that visually displays information to be presented to a user. The output unit 24 may be a display device such as a light emitting device, a liquid crystal display, an organic electro-luminescence display, etc. Alternatively, the output unit 24 may be a speaker outputting audio signal and its driving circuit.

I/F 25 is a wired and/or wireless communication interface between the image reading apparatus 10 and the computer apparatus 30. The image reading apparatus 10 can transmit the image data of the document read via I/F 25 to the computer apparatus 30. The image reading apparatus 10 receives setting information and instruction on the operation of the image reading apparatus 10 via I/F 25 from the computer apparatus 30. In an exemplary embodiment, the image reading apparatus 10 may receive via I/F 25 the image data having been processed by the computer apparatus 30.

The computer apparatus 30 includes CPU 31, an auxiliary storage device 32, a memory 33, an input unit 34, an output unit 35, a medium reading unit 36 and I/F 37. CPU 31 executes the computer program stored in the auxiliary storage device 32 to thereby execute the information processing in accordance with the computer program. In an exemplary embodiment, CPU 31 may execute image processing of the document image read by the image reading apparatus 10. The auxiliary storage device 32 may store a computer program for such an image processing. The auxiliary storage device 32 may includes a non-volatile storage device, or ROM (Read Only Memory), or a hard disk for storing the computer program.

The memory 33 stores the program being executed by CPU 31 or data temporarily used in this program. The memory 33 may include RAM (Random Access Memory). The input unit 34 is an input device for receiving input operation by a user. The input unit 34 may be, for example, a key pad, a keyboard, a pointing device, a touch panel, etc.

The output unit 35 is an output device for outputting the signal processed by the computer apparatus 30. For example, the output unit 35 may be a display device for visually displaying to a user the information processed by the computer apparatus 30. The output unit 35 may be a display device such as, for example, a liquid crystal display, a CRT (Cathode Ray Tube) display, an organic electroluminescence display, etc. Alternatively, the output unit 35 may be a speaker and its driving circuit for outputting audio signal.

The medium reading unit 36 is an input device for reading the data stored in a computer readable and portable recording medium. For example, the medium reading unit 36 may be a CD-ROM drive apparatus, a DVD-ROM drive apparatus, a flexible disc drive apparatus, a CD-R drive apparatus, a DVD-R drive apparatus, a MO drive apparatus or an access apparatus to a flash memory apparatus.

I/F 37 is a wired/wireless communication interface between the image reading apparatus 10 and the computer apparatus 30. The computer apparatus 30 can receive via I/F 37 the image data of a document read by the image reading apparatus 10. The computer apparatus 30 transmits setting information and instruction on the operation of the image reading apparatus 10 via I/F 37 to the image reading apparatus 10.

2. First Exemplary Embodiment 2.1 Functional Construction

Figure 1:
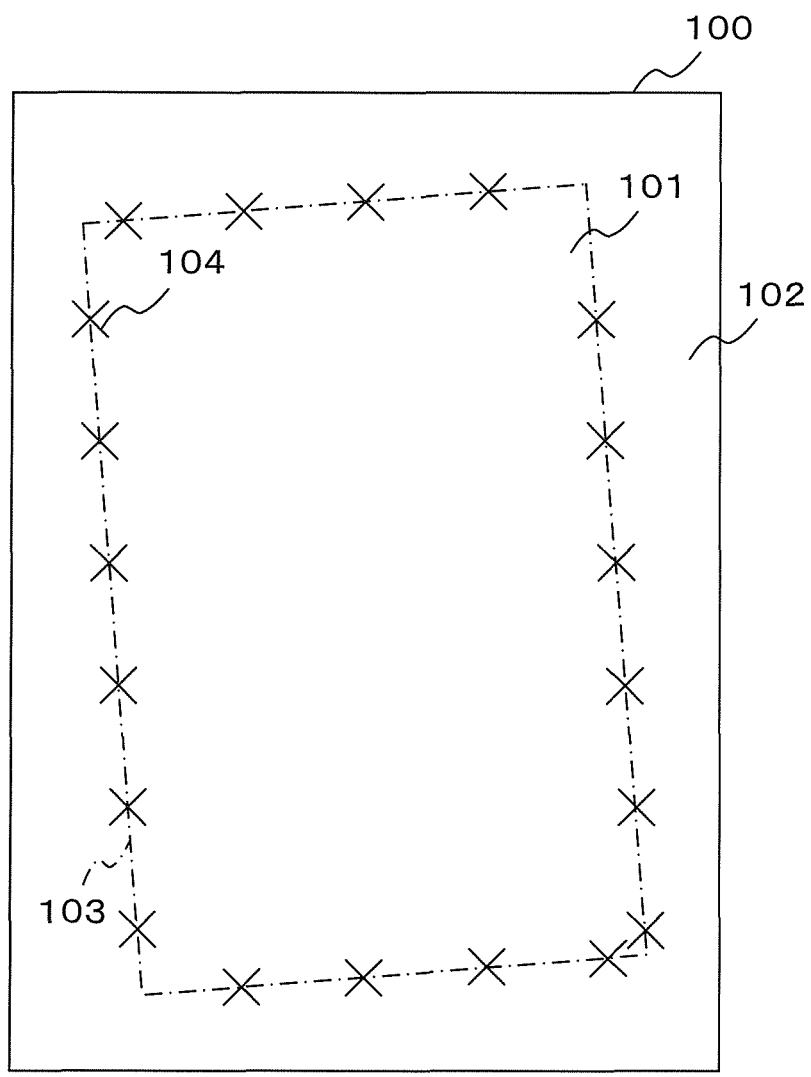
FIG. 1 is a schematic view depicting image data relevant to the description of the background art.
Figure 3:
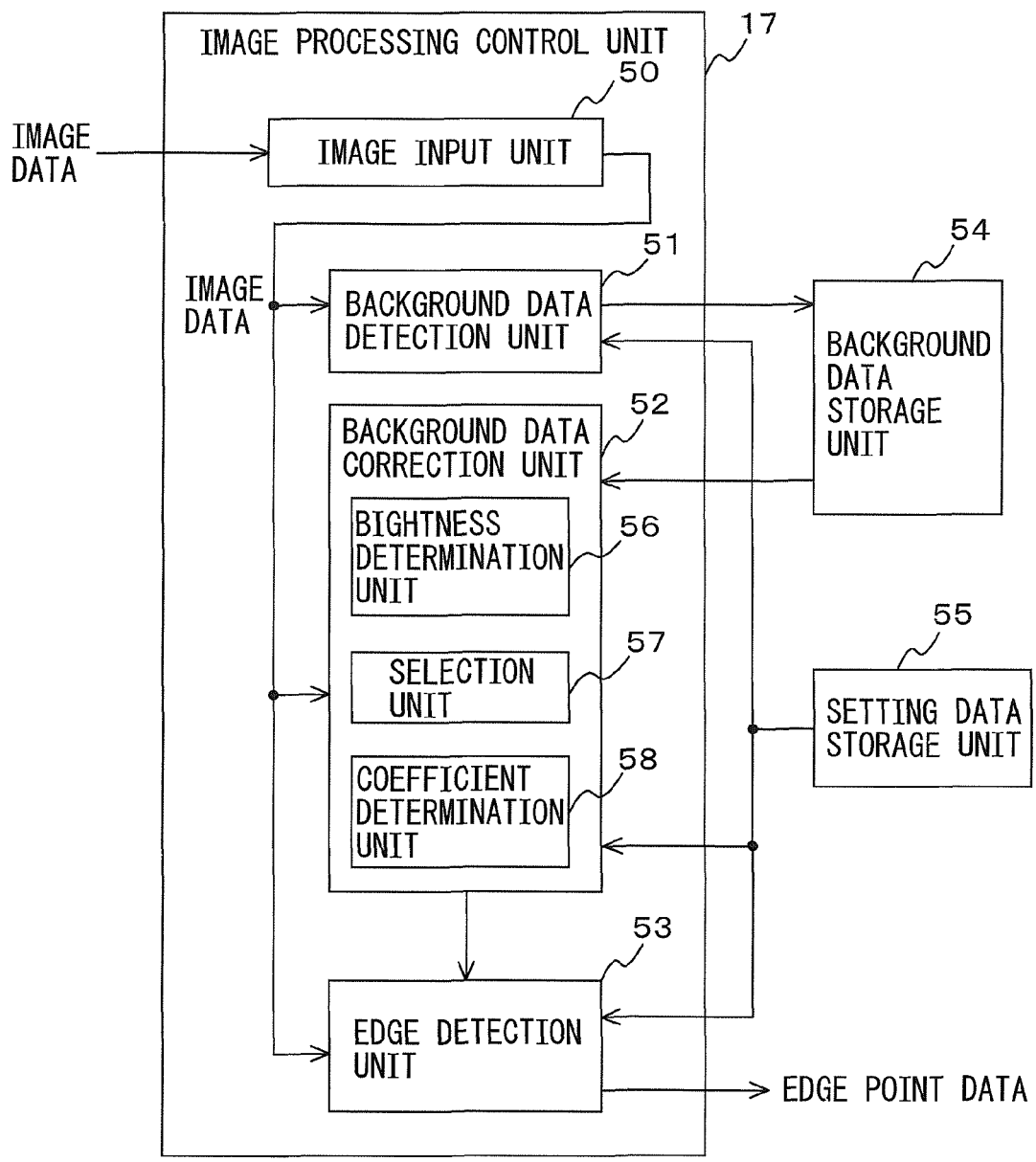
FIG. 3 is a view depicting an exemplary construction of the function of an image processing control unit.

FIG. 3 is a view depicting an exemplary functional construction of the image processing control unit 17. The image processing control unit 17 includes an image input unit 50, a background data detection unit 51, a background data correction unit 52, and an edge detection unit 53. FIG. 3 depicts mainly those functions related to the description that follows. Thus, the image processing control unit 17 may include constituents other than those depicted in the drawing. The image processing control unit 17 stores background data to be described later in a background data storage unit 54. The image processing control unit 17 reads out prescribed setting data from a setting data storage unit 55. The background data storage unit 54 and the setting data storage unit 55 are implemented as a portion of the storage region of the memory 12 depicted in FIG. 2.

In another exemplary embodiment, a part or all of the processing performed by the image input unit 50, the background data detection unit 51, the background data correction unit 52 and the edge detection unit 53 may be performed by CPU 11 in place of the image processing control unit 17. In another exemplary embodiment, a part or all of these processing may be performed by CPU 31 of the computer apparatus 30. The background data storage unit 54 and the setting data storage unit 55 may be implemented as a portion of the storage region of the memory 33 of the computer apparatus 30.

The computer program that causes CPU 31 to execute the information processing may be recorded onto a machine-readable recording medium, and read by the medium reading unit 36 and installed in the auxiliary storage device 32. The computer program that causes CPU 31 to execute the information processing may be downloaded via a network interface (not shown) and installed in the auxiliary storage device 32.

Figure 4:
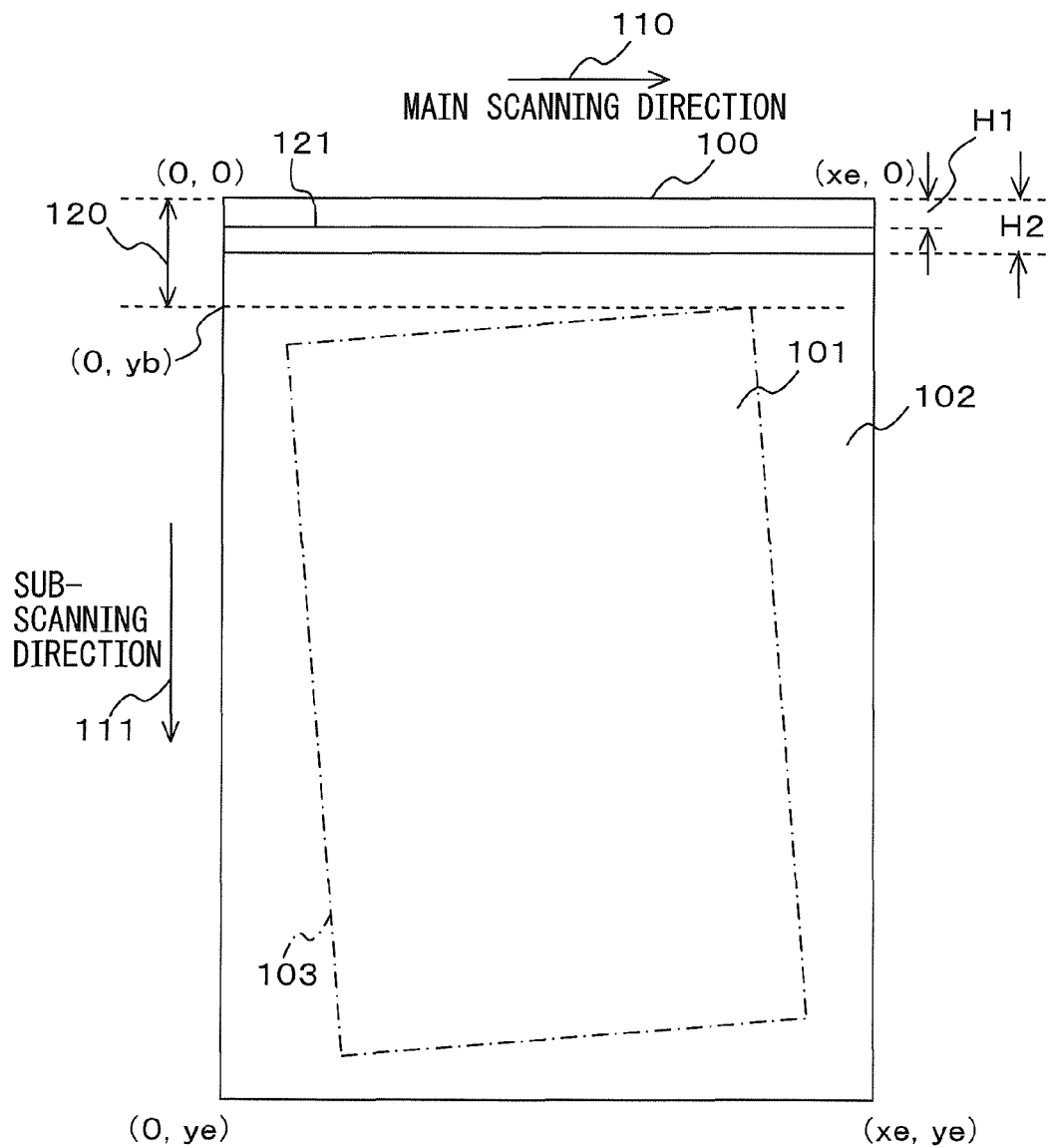
FIG. 4 is a schematic view depicting image data relevant to the description of an embodiment.

The image input unit 50 takes image data as input. FIG. 4 is a schematic view depicting exemplary image data used in the description that follows. Image data 100 include a document region 101 formed by a set of pixels obtained by reading the image of the document with the image sensor 13 and a background region 102 formed by a set of pixels obtained by detecting the light outside the document with the image sensor 13. For example, the background region 102 is formed by a set of pixels obtained by reading the surface of a background unit with the image sensor 13. Reference numeral 103 denotes the boundary line between the document region 101 and the background region 102.

The main scanning direction of the image sensor 13 is depicted with an arrow 110 and the sub-scanning direction is depicted with an arrow 111. Image data 100 have (xe+1) pixels in the main scanning direction 110 and (ye+1) pixels in sub-scanning direction 111. Taking the main scanning direction 110 as X-axis direction and the sub-scanning direction 111 as Y-axis direction, position of each pixel in image data 100 is represented by the coordinate (x, y). X-coordinates of the starting end and the terminal end of main scanning direction 110 are taken as "0" and "xe", respectively, and y-coordinates of the starting end and the terminal end of sub-scanning direction 111 are taken as "0" and "ye", respectively.

Image data 100 have a range 120 in sub-scanning direction that does not include the document region 101. In the example of FIG. 4, the range 120 does not include document region 101 in a range of Y-coordinate "0" to "yb". Such range 120 is denoted as "incidental region" in the description that follows. The incidental region 120 may be generated, for example, by the document sensor 22 reading the document position during conveyance, and causing the image sensor 13 to start reading image before the front end of the document reaches the document reading position for the image sensor 13. In another exemplary embodiment, a flat bed scanner may be provided with a document sensor that detects document size. In this exemplary embodiment, sub-scanning is performed in excess of the document size so as to generate the incidental region 120. The incidental region 120 is formed from a set of pixels that is obtained by reading the surface of the background unit with the image sensor 13, just as the background region 102.

Figure 5:
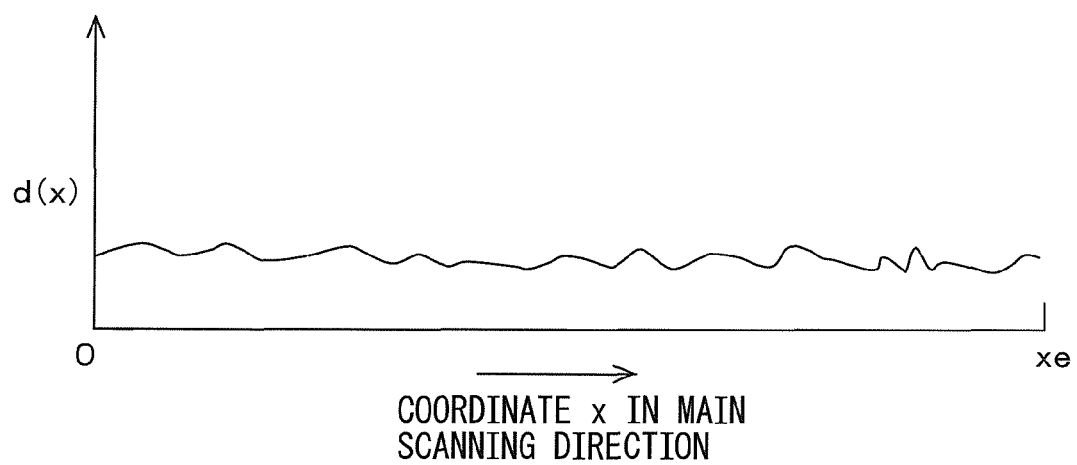
FIG. 5 is a view for illustrating an example of background data.

Referring to FIG. 3, the background data detection unit 51 detects the brightness of each pixel on the main scan line obtained by reading the surface of the background unit with the image sensor 13, and outputs it as the background data d. FIG. 5 is a view for illustrating an example of the background data d. The graph in FIG. 5 represents the brightness of the pixel at coordinate x on the main scan line that reads the surface of the background unit with the image sensor 13.

The background data detection unit 51 may detect the brightness of each pixel on a plurality of main scan lines in the incidental region 120, and calculate the background data d by averaging the brightness over the plurality of main scan lines at same x-coordinate. The background data detection unit 51 may output the brightness detected on any one main scan line in the incidental region 120 as the background data d. The background data d outputted by the background data detection unit 51 are stored in the background data storage unit 54. The main scan line in the incidental region 120 on which the background data d are detected is an example of the first main scan line.

Referring to FIG. 3, the background data correction unit 52 corrects the background data d for each main scan line taken as a target on which detecting an edge point in the image data, such that the brightness of the background data d approaches to the brightness of the background region 102 on the main scan line. In the description that follows, a line taken as a target on which detecting an edge point may be denoted as "target line". A target line is an example of the second main scan line.

FIG. 6 depicts an example of a target line. The target line 130 depicted in FIG. 6 extends along the main scanning direction from the coordinate (0, y1) to the coordinate (xe, y1). As will be described later, the edge detection unit 53 detects an edge point 104 on the boundary line 103 between the document region 101 and the background region 102, on the target line 130. The image processing control unit 17 may select target lines separated by a prescribed number of lines from the main scan lines in the image data 100. In another exemplary embodiment, the image processing control unit 17 may select each of a plurality of main scan lines adjoining each other as target line 130.

Figure 7A:
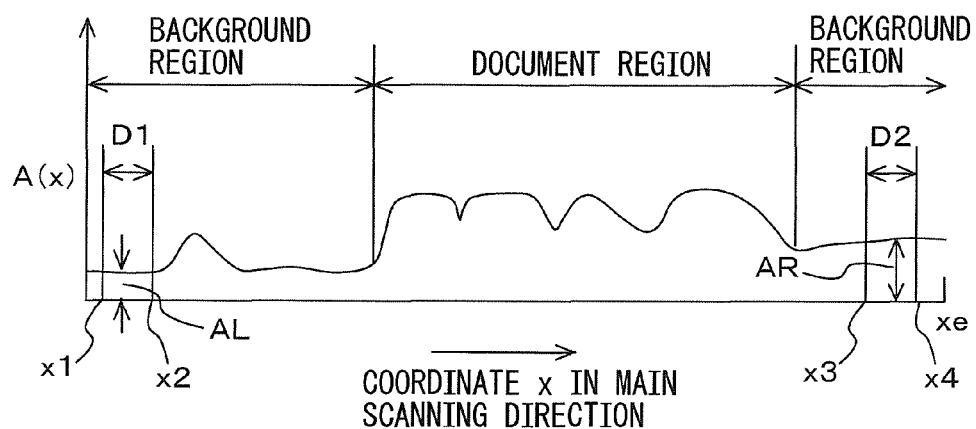
FIG. 7A is a view for illustrating examples of image data on a target line.

FIG. 7A depicts an example of the brightness of pixels on a target line. The graph of FIG. 7A depicts the brightness of respective pixels at coordinate x on the target line. In the description that follows, the brightness data of each pixel on a target line is denoted as "image data A". FIG. 7A depicts an example of image data A when a document of relatively low density is read with the image sensor 13 near its center. Thus, the brightness at each coordinate x on the target line is large in the document region near the center, and the brightness AL and AR on the starting end and the terminating end of the target line is smaller than the brightness near the center.

Figure 7B:
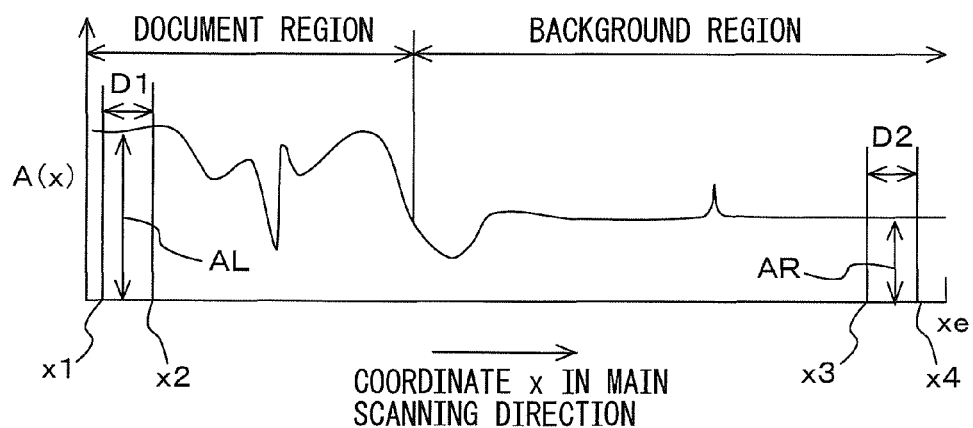
FIG. 7B is a view for illustrating examples of image data on a target line.

FIG. 7B depicts an example of image data A on another target line. FIG. 7A depicts an example of image data A when a document of relatively low density is read in a state close to the starting end of the image sensor 13. Brightness AL at the starting end included in the document region is significantly larger than the brightness AR at the terminating end.

The background data correction unit 52 detects the brightness of a plurality of portions of the image data A on a target line, and corrects the background data d such that the brightness of the background data d approaches to the brightness of the background region 102 on the target line. The background data correction unit 52 includes a brightness determination unit 56, a selection unit 57, and a coefficient determination unit 58. The brightness determination unit 56 detects the brightness AL and AR at the starting end and the terminating end of image data A.

FIG. 7A and FIG. 7B depict detection ranges of the brightness AL and AR at the starting end and the terminating end. The range D1 in which the brightness AL at the starting end is detected is the range of the value of x-coordinate of x1 to x2, and the range D2 in which the brightness AR at the terminating end is detected is the range of the value of x-coordinate of x3 to x4. The brightness determination unit 56 calculates the average of brightness of plural pixels in the image data A in the range D1 as AL, and the average of brightness of plural pixels in the image data A in the range D2 as AR.

In another exemplary embodiment, the brightness determination unit 56 may select the brightness of any one pixel in the image data A in the range D1 as AL, and the brightness of any one pixel in the image data A in the range D2 as AR. The setting values of coordinates x1, x2, x3 and x4 are stored in the setting data storage unit 55, and are read-out by the brightness determination unit 56. The values of coordinates x1, x2, x3 and x4 may be set at the time of manufacturing the image reading apparatus 10, or may be set by a user by operating the input unit 23 of the image reading apparatus 10 or the input unit 34 of the computer apparatus 30. In another exemplary embodiment, the values of coordinates x1, x2, x3 and x4 may be fixed values.

The brightness determination unit 56 determines whether or not the absolute value of the difference |AL−AR| between the brightness AL and AR is smaller than a prescribed threshold T1. If the absolute value |AL−AR| is smaller than the threshold T1, the document is read by the image sensor 13 near the center, it can be determined that both brightness AL and AR have the brightness of the background region 102. In this case, both brightness AL and AR in the range D1 and D2 can be used for correction of the background data d. Setting of the threshold T1 is stored in the setting data storage unit 55, and is read-out by the brightness determination unit 56. Value of the threshold T1 may be set at the time of manufacturing the image reading apparatus 10, or may be set by a user operating the input unit 23 of the image reading apparatus 10 or the input unit 34 of the computer apparatus 30. In another exemplary embodiment, value of the threshold T1 may be a fixed value.

If the absolute value |AL−AR| is equal to or larger than the threshold T1, it can be determined that the document is read by the image sensor 13 close to the starting end or the terminating end, and that either one of the brightness AL or AR at the starting end or the terminating end has the brightness of the document region 101. In this case, one of AL and AR having the brightness of the document region 101 cannot be used for correction of the background data d, and only the other having the brightness of the background region 102 can be used.

Figure 8A:
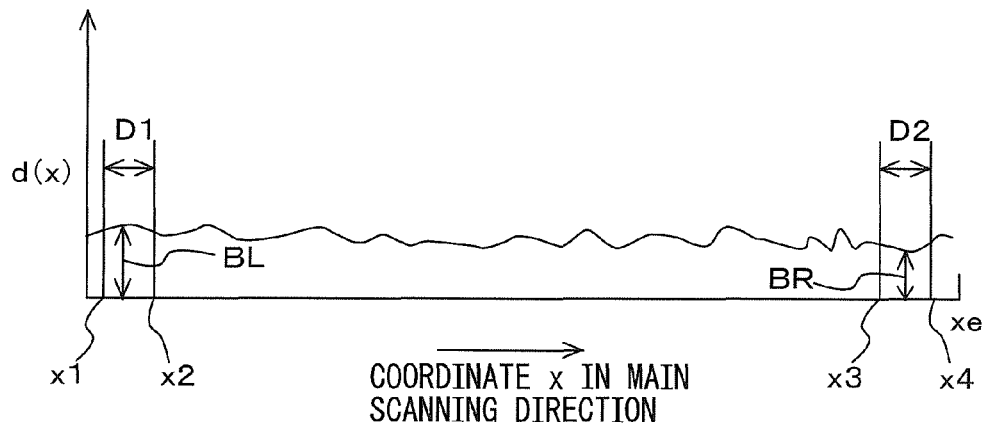
FIG. 8A is a view for illustrating examples of correction of background data.

If the absolute value |AL−AR| is equal to or larger than the threshold T1, the brightness determination unit 56 detects the brightness BL and BP of the background data d in the same range of x-coordinate as the ranges D1 and D2. In the description that follows, the brightness BL of the background data d in the same range of x-coordinate as the range D1 may be denoted as the brightness BL on the starting point side. Also, the brightness BR of the background data d in the same range of x-coordinate as the range D2 may be denoted as the brightness BL on the terminating end side. FIG. 8A is a view for illustrating the detecting position of the brightness BL and BR of the background data d on the starting point side and the terminating end side.

The brightness determination unit 56 calculates the average of brightness of plural pixels of the background data d in the range D1 as BL and the average of brightness of plural pixels of the background data d in the range D2 as BR. In other exemplary embodiment, the brightness determination unit 56 may select the brightness of any one pixel in the range D1 as BL and the brightness of any one pixel in the range D2 as BR.

The brightness determination unit 56 determines which is larger, the absolute value of the difference |BL−AL| of the brightness between the background data d and the image data A in the range D1, or the absolute value of the difference |BR−AR| of the brightness between the background data d and the image data A in the range D2. If the absolute value of the difference |BL−AL| of the brightness in the range D1 is smaller than the absolute value of the difference |BR−AR| of the brightness in the range D2, it can be determined that the brightness AL of the image data A in the range D1 has the brightness of the background region 102, and that the document is close to the terminating end side.

On the contrary, if the absolute value of the difference |BL−AL| of the brightness in the range D1 is not smaller than the absolute value of the difference |BR−AR| of the brightness in the range D2, it can be determined that the brightness AR of the image data A in the range D2 has the brightness of the background region 102, and that the document is close to the starting point side.

If the brightness difference |AL−AR| is equal to or larger than the threshold T1, the selection unit 57 selects, in accordance with the determination by the brightness determination unit 56, either one of ranges D1 and D2 in which the brightness of the image data A has the brightness of the background region 102. Thus, if the difference |BL−AL| of the brightness between the background data d and the image data A in the range D1 is smaller than the difference |BR−AR| of the brightness in the range D2, the selection unit 57 selects the range D1. If the difference |BL−AL| of the brightness in the range D1 is not smaller than the difference |BR−AR| of the brightness in the range D2, the selection unit 57 selects the range D2. By selecting either the range D1 or the range D2 in such a way, the selection unit 57 selects either one of the brightness AL and AR of image data in these ranges as the brightness of image data A to be used for correction of the background data d.

The coefficient determination unit 58 determines correction coefficient Q(x) for correcting the background data d in accordance with the determination method selected depending on which of (Case 1) to (Case 3) described below the determination result of the brightness determination unit 56 falls. The background data correction unit 52 calculates the corrected background data d' by multiplying the correction coefficient Q(x) to the background data d in accordance with the following equation (1).

$$d'(x) = Q(x) \times d(x) \quad (1)$$

In the above equation, x represents x-coordinate on the main scan line, and Q(x) represents the correction coefficient multiplied to the value d(x) at each x-coordinate of the background data d. d'(x) represents the value of the corrected background data d' at each x-coordinate on the main scan line.

(Case 1) In the case where the absolute value of the difference |AL−AR| between the brightness AL and AR is smaller than a prescribed threshold T1, the coefficient determination unit 58 determines the correction coefficient Q(x) as exemplified by the following equation (2) based on the brightness of the background data d in the image data A in both ranges D1 and D2.

$$Q(x) = (AR/BR - AL/BL)/(xe) \times x + AL/BL \quad (2)$$

Figure 8B:
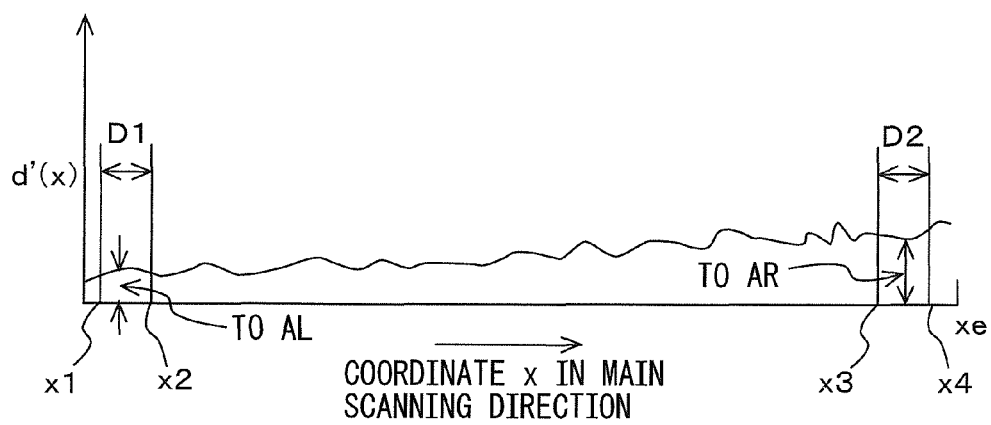
FIG. 8B is a view for illustrating examples of correction of background data.

FIG. 8B depicts an example of the background data as corrected with the correction coefficient Q(x) as exemplified by the equation (2). The correction coefficient Q(x) of the equation (2) is a linear function which has the value "AL/BL" at the starting end side of x-coordinate "0" and the value "AR/BR" at the terminating end side of x-coordinate "xe". Thus, if the brightness at the starting end and terminating end of the background data d is BL and BR, respectively, the brightness at the starting end and terminating end of the corrected background data d' is approximately AL and AR, respectively. Therefore, even if there is brightness fluctuation varying along the main scan line 110 in the background region 102 of the image data A of the target line, the brightness of the background data d' can be approximated to the brightness of the background region 102 of the image data A in the range of starting end and terminating end of the target line in the background region 102.

In the case where the absolute value of the difference |AL−AR| between the brightness AL and AR is not smaller than a prescribed threshold T1, the coefficient determination unit 58 determines the correction coefficient Q(x) as exemplified by the following equation (3) or (4) based on the brightness of the background data d of the image data A in the range selected by the selection unit 57.

(Case 2) The case where the selection unit 57 selects the range D1:

$$Q(x) = AL/BL \quad (3)$$

(Case 3) The case where the selection unit 57 selects the range D2:

$$Q(x) = AR/BR \quad (4)$$

Figure 8C:
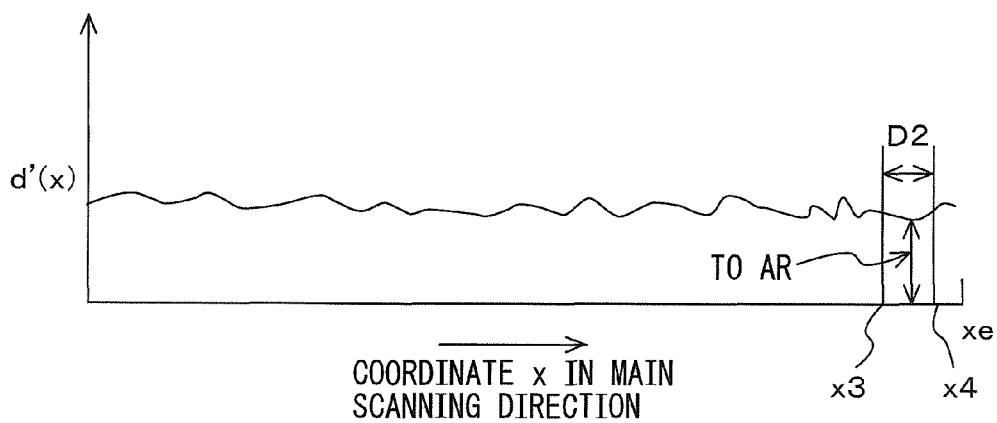
FIG. 8C is a view for illustrating examples of correction of background data.

FIG. 8C depicts an example of the background data corrected with the correction coefficient Q(x) as exemplified by the equation (4). The correction coefficient Q(x) of equation (4) is used when the range D1 on the starting end side is included in the document region 101, as shown FIG. 7B. The correction coefficient Q(x) brings the brightness of the background data d' in the range D2 on the terminating end side having brightness AR of the background region 102 closer to AR.

Therefore, in the range of terminating end of the target line, the brightness of the background data d' can be brought closer to the brightness of the background region 102 of the image data A. By using only the brightness AR of the terminating end side for correction, the background data d is prevented from being corrected more than the brightness of the background region 102 due to the brightness AL on the starting end side in the document region 101.

Similarly, when the range D2 on the terminating end side is included in the document region 101, the brightness of the background data d' can be brought closer to the brightness of the background region 102 of the image data A by the correction coefficient Q(x) as exemplified by equation (3). Also, the background data d are prevented from being corrected otherwise than the brightness of the background region 102 due to the brightness AR on the terminating end side in the document region 101.

Referring to FIG. 3, the edge detection unit 53 calculates the corrected image data A' by subtracting the corrected background data d' from the image data A in accordance with the following equation (5).

$$A'(x) = A(x) - d'(x) \quad (5)$$

In the above equation (5), A(x) represents the brightness value at each x-coordinate of the image data A on the target line. A'(x) represents the brightness value at each x-coordinate of the corrected image data A'.

Figure 9A:
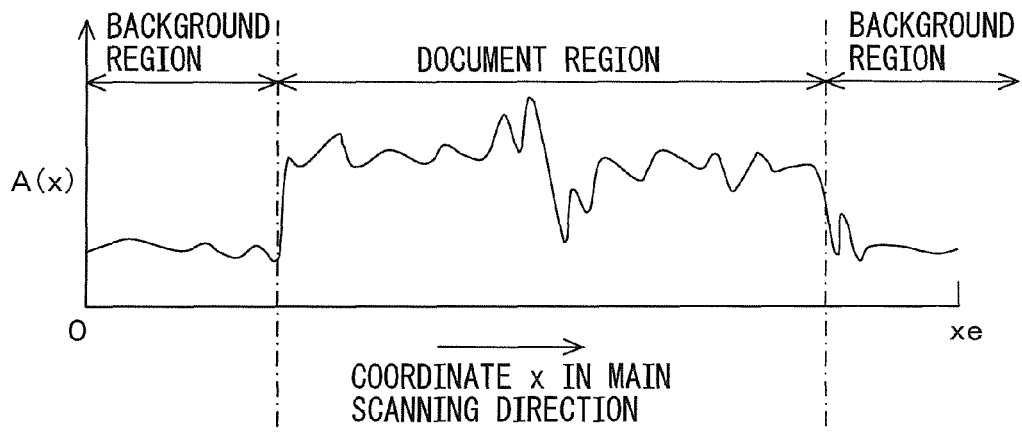
FIG. 9A is a view for illustrating a first example of the processing of detection of edge point.
Figure 9B:
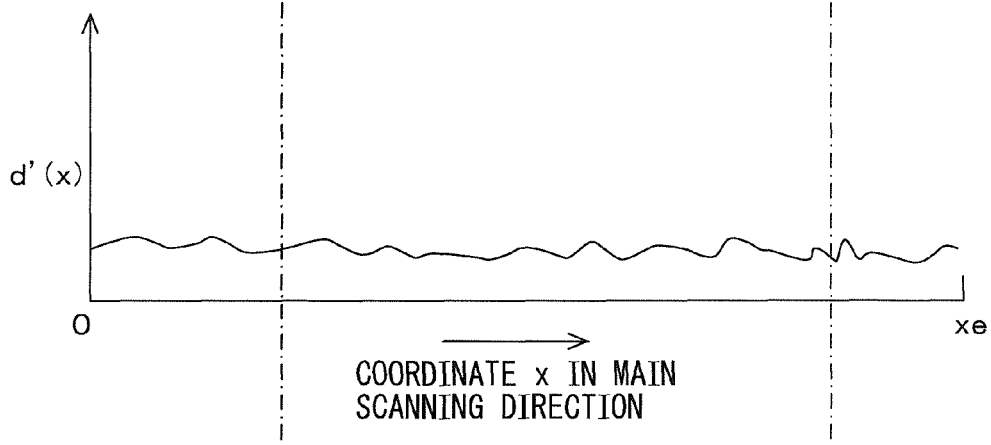
FIG. 9B is a view for illustrating a first example of the processing of detection of edge point.
Figure 9C:
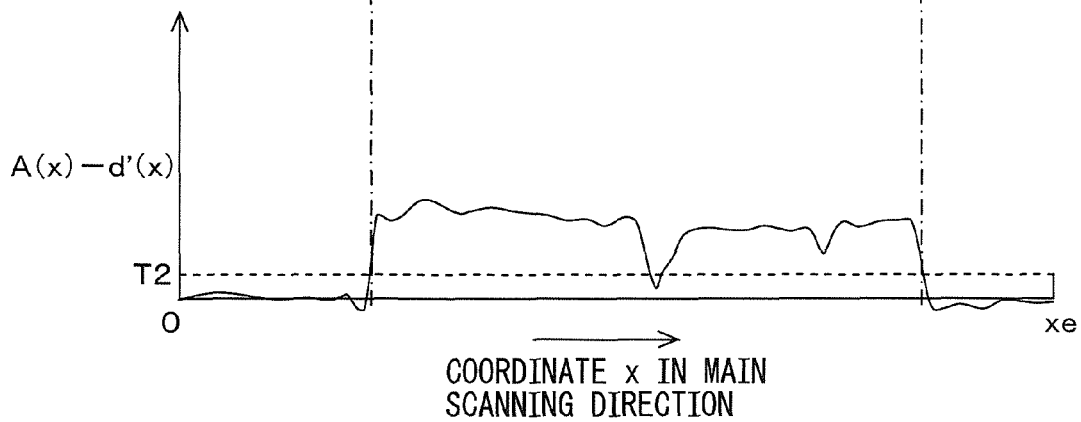
FIG. 9C is a view for illustrating a first example of the processing of detection of edge point.

FIG. 9A and FIG. 9B depict examples of the image data A and the corrected background data d'. FIG. 9C depicts an example of the result of correcting the image data A of FIG. 9A by using the corrected background data d' of FIG. 9B. The value of the corrected background data d' is approximated to the value of the image data A in the background region. Thus, irrespective of the brightness of the background region on the target line, the value of the corrected image data (A−d') is approximated to the value "0".

The edge detection unit 53 detects a point at which the corrected image data A' reaches a prescribed threshold T2 as a candidate for an edge point. The set value of the threshold T2 is stored in the setting data storage unit 55, and is read-out by the edge detection unit 53. The value of the threshold T2 may be set at the time of manufacture of the image reading apparatus 10, or may be set a user operating the input unit 23 of the image reading apparatus 10 or the input unit 34 of the computer apparatus 30. In other exemplary embodiment, the value of the threshold T2 may be a fixed value.

2.2 Description of Operation

Figure 10:
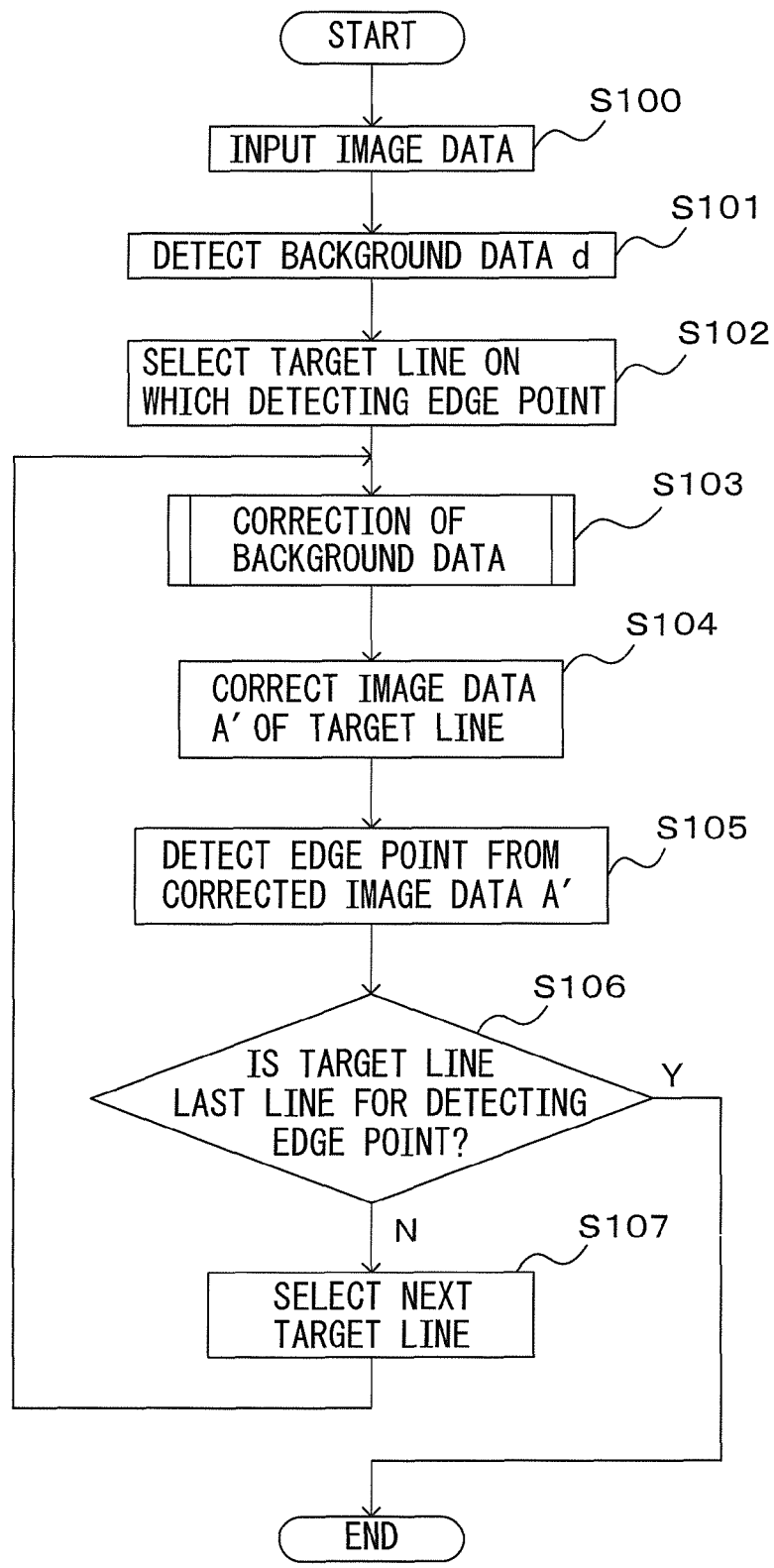
FIG. 10 is a view for illustrating the operation of the image processing control unit.

Operation of the image processing control unit 17 will be described below. FIG. 10 is a view for illustrating the operation of the image processing control unit 17. At step S100, the image processing system 1 takes image data as input. At step S101, the background data detection unit 51 detects the background data d form the incidental region of the inputted image data. At step S102, the image processing control unit 17 selects any one main scan line as an initial target line on which detecting an edge point. At step S103, the background data correction unit 52 performs background data correction processing for correcting the background data d in accordance with the brightness of pixels on the target line.

FIG. 11 is a view for illustrating the background data correction processing. At step S200, the brightness determination unit 56 detects the brightness AL and AR in the range D1 on the starting end side and the range D2 on the terminating end side. At step S201, the brightness determination unit 56 determines whether or not the absolute value of the difference |AL−AR| of brightness between AL and AR is smaller than a prescribed threshold T1. If the absolute value |AL−AR| is smaller than the prescribed threshold T1 (step S201: Y), the processing proceeds to step S202. If the absolute value |AL−AR| is equal to or larger than the prescribed threshold T1 (step S201: N), the processing proceeds to step S203.

At step S202, the coefficient determination unit 58 determines the correction coefficient Q as exemplified by equation (2) above, based on the brightness of the background data d of both image data A in the ranges D1 and D2. Thereafter, the processing proceeds to step S207.

At step S203, the brightness determination unit 56 detects the brightness BL and BR of the background data d in the ranges D1 and D2. At step S204, the brightness determination unit 56 determines whether or not the absolute value of the difference |BL−AL| of the brightness between the background data d and the image data A in the range D1 is smaller than the absolute value of the difference |BR−AR| of the brightness between the background data d and the image data A in the range D2. If the absolute value |BL−AL| is equal to or larger than the absolute value |BR−AR|, (step S204: N), the processing proceeds to step S205. If the absolute value |BL−AL| is smaller than the absolute value |BR−AR|, (step S204: Y), the processing proceeds to step S206.

At step S205, the selection unit 57 selects the range D2. The coefficient determination unit 58 determines the correction coefficient Q as exemplified by the equation (4) above based on the brightness AR and BR of the background data d of the image data A in the selected range D2. Thereafter, the processing proceeds to step S207. At step S206, the selection unit 57 selects the range D1. The coefficient determination unit 58 determines the correction coefficient Q as exemplified by the equation (3) above based on the brightness AL and BL of the background data d of the image data A in the selected range D1. Thereafter, the processing proceeds to step S207. At step S207, the background data correction unit 52 calculates the corrected background data d' by multiplying the correction coefficient Q to the background data d. Thereafter, the processing is terminated.

Referring to FIG. 10, at step S104, the edge detection unit 53 calculates the corrected image data A' by subtracting the corrected background data d' from the image data A. At step S105, the edge detection unit 53 detects a point at which the corrected image data A' reaches a prescribed threshold T2 as a candidate for an edge point.

At step S106, the image processing control unit 17 determines whether or not the target line selected at step S102 is the last main scan line as the target on which detecting an edge point. If the target line selected is the last main scan line (step S106: Y), the processing is terminated. If the target line selected is not the last main scan line (step S106: N), the processing proceeds to step S107. At step S107, the image processing control unit 17 selects next target line for detecting an edge point. Thereafter, the processing returns to step S103.

2.3 Effect

In accordance with the present exemplary embodiment, an edge point is detected after the image data A is corrected with the corrected background data d' such that the value of the brightness of the image data A of the background region 102 on the target line is approximated to "0". Thus, irrespective of the brightness of the image data A of the background region 102, the threshold T2 for detecting an edge point can be set to small value, and the accuracy of detecting an edge point can be thereby improved. This will be illustrated below with reference to FIG. 12A and FIG. 12B.

Figure 12A:
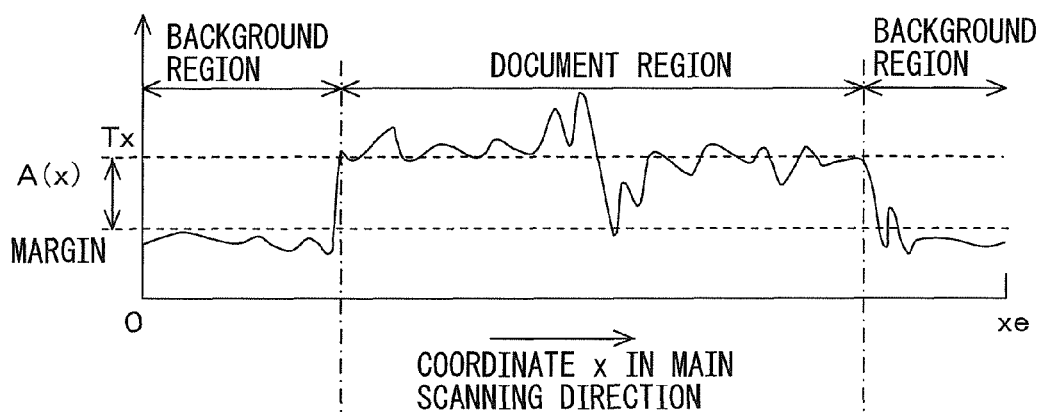
FIG. 12A is a view for illustrating the difference between the cases with and without correction of image data with background data.
Figure 12B:
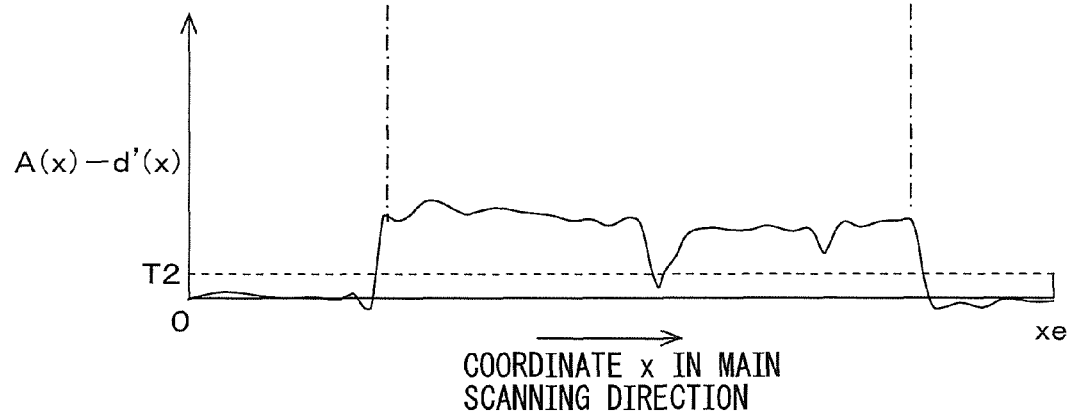
FIG. 12B is a view for illustrating the difference between the cases with and without correction of image data with background data.

FIG. 12A depicts the image data A without correction by using the background data d. The brightness of the background region 102 can take various values depending on the density or state of the background unit. Therefore, threshold Tx to be compared with the image data for detecting an edge point is set to a relatively large value with a margin in order to accommodate the difference of the brightness of the background region 102 between documents. If large margin of the threshold Tx is adopted, the difference between threshold Tx and the brightness of the document region becomes small and detection accuracy for detecting an edge point is lowered.

In accordance with the present exemplary embodiment, irrespective of the brightness of the image data A of the background region 102, the corrected image data A'=A−d has small value in the background region 102. Therefore, the margin of threshold Tx can be made small, and the accuracy of detecting an edge point can be improved.

Also, in accordance with the present exemplary embodiment, the image data A are corrected by using background data d' corrected for each target line. Therefore, even if there is brightness fluctuation along the sub-scanning direction in the background region, the image data A can be corrected in accordance with the brightness fluctuation. Thus, even if there is brightness fluctuation along the sub-scanning direction in the background region of the image data A, detection accuracy for detecting an edge point can be improved. Also, in accordance with the present exemplary embodiment, the background data d' corrected by using both brightness AL and AR of the image data in plural ranges D1 and D2 on the target line along the main scanning direction are used to correct the image data A. Therefore, even if there is brightness fluctuation along the main scanning direction in the background region, the image data A can be corrected in accordance with the brightness fluctuation. Thus, even if there is brightness fluctuation along the main scanning direction in the background region of the image data A, detection accuracy for detecting an edge point can be improved.

Also, in accordance with the present exemplary embodiment, it is determined whether the document region is situated closer to the starting end side or to the terminating end side. If the document region is situated closer either to the starting end side or to the terminating end side, the background data d are corrected by using the brightness of image data A in the range either on the starting end side or on the terminating end side which is not the document region. With such correction, the corrected background data d' are prevented from departing from the brightness of the background region by using the brightness of the document region in the correction of the background data d.

2.4 Variant of the Embodiment

In the present exemplary embodiment, the ranges D1 and D2 on the starting end side and on the terminating end side of a target line are used as plural regions for detecting the brightness AL and AR of the image data A used for correction of the background data d. However, plural regions for detecting the brightness of the image data A used for correction of the background data d are not limited to two but may be three or more regions. Also, the plural regions for detecting the brightness of the image data A used for correction of the background data d are not necessarily the ranges on the starting end side and on the terminating end side, but may be any ranges in the background region. The background data correction unit 52 may estimate the brightness of the background region along the main scanning direction based on the difference of brightness between plural point in the background region by means of interpolation and extrapolation processing, and may correct the background data d based on the estimation result.

3. Second Exemplary Embodiment

Another exemplary embodiment of the image processing system 1 will be described. In the present exemplary embodiment, a background unit having intermediate density is used when reading a document with the image sensor 13 in order to be able to detect an edge point irrespective of whether the ground color of the document is of high density or low density.

The edge detection unit 53 of the present exemplary embodiment calculates the absolute value of the difference between the corrected background data d' and the image data A in accordance with equation (6) below, as the corrected image data A'.

$$A'(x)=|A(x)-d'(x)| \quad (6)$$

Figure 13A:
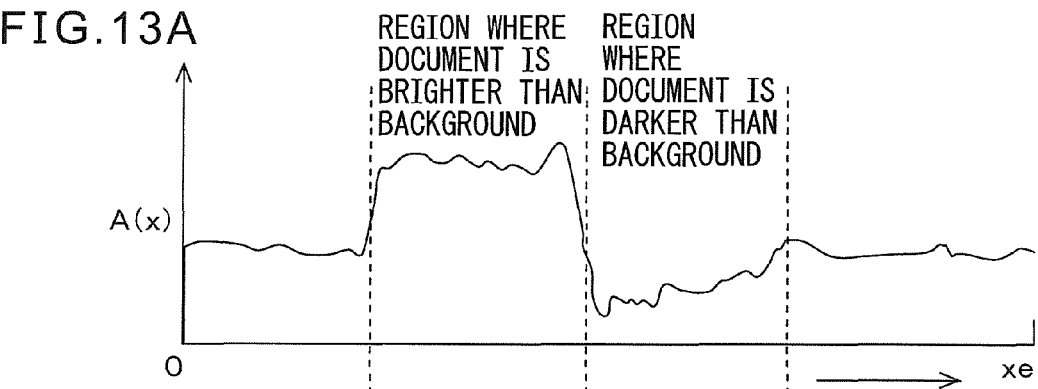
FIG. 13A is a view for illustrating a second example of the processing of detection of edge point.
Figure 13B:
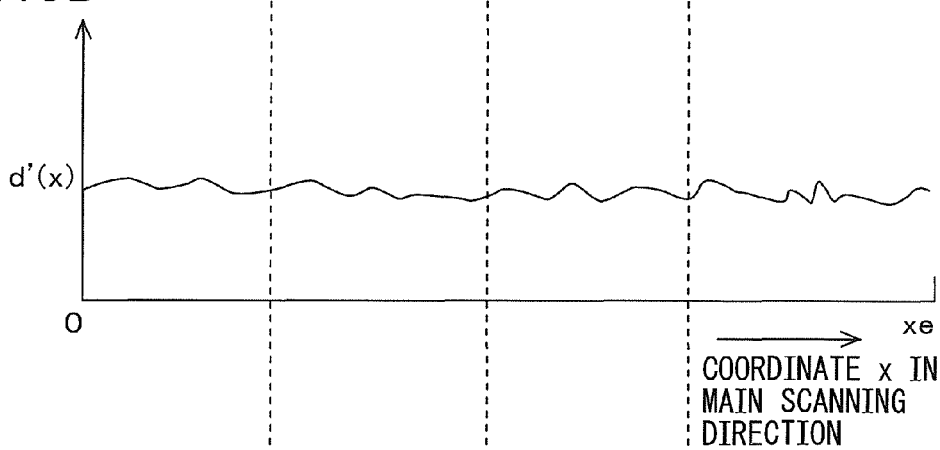
FIG. 13B is a view for illustrating a second example of the processing of detection of edge point.
Figure 13C:
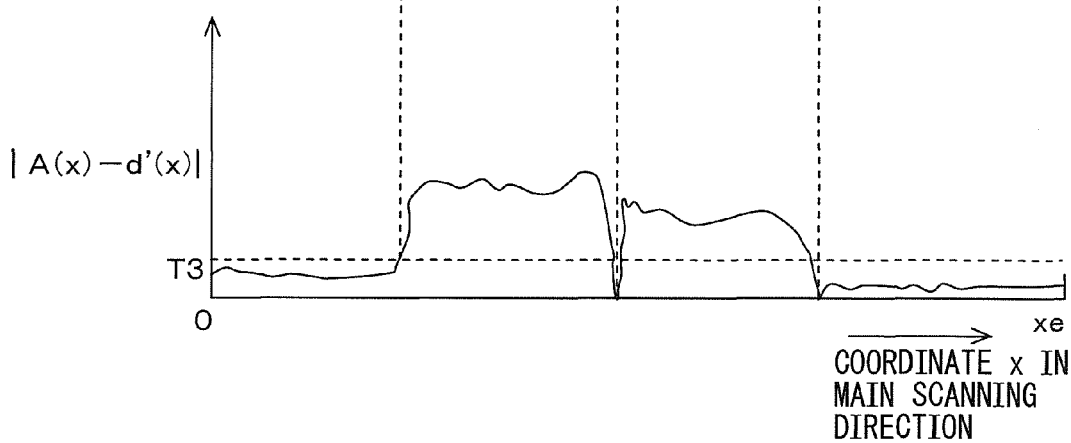
FIG. 13C is a view for illustrating a second example of the processing of detection of edge point.

FIGS. 13A and 13B are examples of the image data A and the corrected background data d'. FIG. 13C depicts an example of the image data A of FIG. 13A corrected by the corrected background data d' of FIG. 13B. By adopting the absolute value of the difference between the corrected background data d' and the image data A as the image data A', the value of the corrected image data |A−d'| turns out to be positive irrespective of whether the document is brighter region or darker region than the background region. The edge detection unit 53 detects a point at which the corrected image data A' reaches a prescribed threshold T3 as a candidate for an edge point. The set value of threshold T3 is stored in the setting data storage unit 55, and is read-out by the edge detection unit 53. The value of the threshold T3 may be set at the time of manufacture of the image reading apparatus 10, or may be set by a user operating the input unit 23 of the image processing apparatus 10 or the input unit 34 of the computer apparatus 30. In other embodiment, the value of the threshold T3 may be a fixed value.

In accordance with the present exemplary embodiment, the value of the brightness of the image data A in the background region is approximated to "0", and corrected image data AT are corrected such that the value of the image data A in the document region takes positive value. Therefore, irrespective of whether the brightness of the background region of the image data A on the target line is large or small, uniform threshold T3 can be used for edge point detection for every target line. The edge point detection processing can be thereby simplified.

With the apparatus, system, method and computer program as described herein, detection accuracy of detecting an edge point of a document region when there is fluctuation of brightness in the background region of image data including a document region.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   an input unit for inputting image data including a document region;
   a storage for storing a brightness of each pixel on a first main scan line outside the document region;
   a corrector for correcting the brightness of each pixel on the first main scan line stored in the storage, in accordance with the brightness of pixels in a first part and the brightness of pixels in a second part on a second main scan line following the first main scan line; and
   an edge point detector for detecting an edge point of the document region situated on the second main scan line, in accordance with a difference between the brightness of each pixel on the first main scan line corrected by the corrector and the brightness of each pixel on the second main scan line, respectively corresponding to each pixel on the first main scan line, wherein at least one of the first part and the second part on the second main scan line is outside of the document region.

2. The image processing apparatus according to claim 1, wherein the corrector comprises a coefficient determination unit for determining, in accordance with the brightness of pixels in the first part and the brightness of pixels in the second part, a correction coefficient for correcting the brightness of pixels existing between a third part on the first main scan line corresponding to the first part on the second main scan line and a fourth part on the first main scan line corresponding to the second part on the second main scan line.

3. The image processing apparatus according to claim 2, wherein the coefficient determination unit determines the correction coefficient by a linear function having a slope determined as a ratio of a difference between the brightness ratio of the pixel in the fourth part to the pixel in the second part and the brightness ratio of the pixel in the third part to the pixel in the first part to a distance between the first part and the second part.

4. The image processing apparatus according to claim 2, wherein the corrector comprises:
   a selector for selecting the brightness of pixels in the first part or the brightness of pixels in the second part in accordance with the difference of the brightness between pixels in the first part and pixels in the third part and the difference of the brightness between pixels in the second part and pixels in the fourth part; and
   a coefficient determination unit for determining the correction coefficient for correcting the brightness of pixels on the first main scan line in accordance with the brightness selected by the selector.

5. A computer-readable, non-transitory medium storing a computer program for image processing, wherein the computer program causes a processor to execute a process comprising:
   acquiring image data including a document region;
   storing in a storage a brightness of each pixel on a first main scan line outside the document region;
   correcting the brightness of each pixel on the first main scan line stored in the storage, in accordance with a brightness of pixels in a first part and the brightness of pixels in a second part on a second main scan line following the first main scan line; and
   detecting an edge point of the document region situated on the second main scan line in accordance with the difference between the corrected brightness of each pixel on the first main scan line and the brightness of each pixel on the second main scan line, respectively corresponding to each pixel on the first main scan line, wherein at least one of the first part and the second part on the second main scan line is outside of the document region.

6. The image processing apparatus according to claim 1, wherein the edge point detector detects the edge point in accordance with an absolute value of a difference between a value of each pixel on the first main scan line corrected by the corrector and a value of each pixel on the second main scan line, respectively corresponding to each pixel on the first main scan line.

7. An image processing system having an image reading apparatus and a computer apparatus that receives, via communication with the image reading apparatus, an image read by the image reading apparatus, comprising:
   a storage for storing, from the image data including a document region read by the image reading apparatus, a brightness of each pixel on a first main scan line outside the document region;
   a corrector for correcting the brightness of each pixel on the first main scan line stored in the storage, in accordance with the brightness of pixels in a first part and the brightness of pixels in a second part on a second main scan line following the first main scan line; and
   an edge point detector for detecting an edge point of the document region situated on the second main scan line, in accordance with a difference between the brightness of each pixel on the first main scan line corrected by the corrector and the brightness of each pixel on the second main scan line, respectively corresponding to each pixel on the first main scan line, wherein at least one of the first part and the second part on the second main scan line is outside of the document region.

8. An image processing method, comprising:
   acquiring image data including a document region;
   storing in a storage a brightness of each pixel on a first main scan line outside the document region;
   correcting the brightness of each pixel on the first main scan line stored in the storage, in accordance with the brightness of pixels in a first part and the brightness of pixels in a second part on a second main scan line following the first main scan line; and
   detecting an edge point of the document region situated on the second main scan line in accordance with a difference between the corrected brightness of each pixel on the first main scan line and the brightness of each pixel on the second main scan line, respectively corresponding to each pixel on the first main scan line, wherein at least one of the first part and the second part on the second main scan line is outside of the document region.

* * * * *

UNITED STATES PATENT AND TRADEMARK OFFICE
CERTIFICATE OF CORRECTION

PATENT NO. : 8,804,209 B2
APPLICATION NO. : 13/714304
DATED : August 12, 2014
INVENTOR(S) : Akira Iwayama et al.

It is certified that error appears in the above-identified patent and that said Letters Patent is hereby corrected as shown below:

On the Title Page

(71) Applicant        Delete "Kahoku",
                      Insert --Kahoku-shi--

(72) Inventors        Delete "Akira Iwayama, Kahoku (JP);
                              Masayoshi Hayashi, Kahoku (JP)"
                      Insert --Akira Iwayama, Kahoku-shi (JP);
                              Masayoshi Hayashi, Kahoku-shi (JP)--

(56) References Cited, pg. 2,     Delete "8,593,689",
Col. 2, U.S. PATENT DOCUMENTS     Insert --8,593,683--

In the Drawings

Delete Drawing Sheet 2 and substitute therefore
                      the Drawing Sheet, consisting of FIG. 2 as shown
                      on the attached page FIG. 2, Sheet 2 of 13, Ref. No. 15    Delete "SEADING PROCESSOR",
                                      Insert --SHADING PROCESSOR--

Signed and Sealed this
Thirtieth Day of June, 2015

Michelle K. Lee
*Director of the United States Patent and Trademark Office*